United States Patent [19]

Heimbuch

[11] Patent Number: 5,719,695
[45] Date of Patent: Feb. 17, 1998

[54] SPATIAL LIGHT MODULATOR WITH SUPERSTRUCTURE LIGHT SHIELD

[75] Inventor: Scott D. Heimbuch, Dallas, Tex.

[73] Assignee: Texas Instruments Incorporated, Dallas, Tex.

[21] Appl. No.: 761,022

[22] Filed: Dec. 5, 1996

Related U.S. Application Data

[63] Continuation of Ser. No. 414,831, Mar. 31, 1995, abandoned.

[51] Int. Cl.⁶ .................................... G02B 26/00
[52] U.S. Cl. .......................... 359/291; 359/846
[58] Field of Search .......................... 359/291, 290, 359/223, 224, 846, 849, 851

[56] References Cited

U.S. PATENT DOCUMENTS

| | | | |
|---|---|---|---|
| 3,886,310 | 5/1975 | Guldberg et al. | 348/771 |
| 4,710,732 | 12/1987 | Hornbeck | 359/291 |
| 4,956,619 | 9/1990 | Hornbeck | 359/317 |
| 5,061,049 | 10/1991 | Hornbeck | 359/224 |
| 5,079,544 | 1/1992 | DeMond et al. | 340/701 |
| 5,105,369 | 4/1992 | Nelson | 364/525 |
| 5,172,262 | 12/1992 | Hornbeck | 359/223 |
| 5,212,582 | 5/1993 | Nelson | 359/224 |
| 5,278,652 | 1/1994 | Urbanus et al. | 358/160 |
| 5,510,824 | 4/1996 | Nelson | 359/295 |

*Primary Examiner*—David C. Nelms
*Assistant Examiner*—Dawn-Marie Bey
*Attorney, Agent, or Firm*—Robert C. Klinger; James C. Kesterson; Richard L. Donaldson

[57] ABSTRACT

A high contrast spatial light modulator (40) formed of micro-mechanical pixels (10). The supporting superstructure comprising the posts (12) and hinges (16) of the pixels (10) are shielded by an umbrella-like elevated light shield (42) extending over the hinge and posts. These light shields (42) are generally square in shape, and have edges arranged at approximately 45° with respect to the incident light to minimize diffraction of light therefrom into projection optics. The upper surfaces of the shields may be anodized to achieve a non-reflective, black surface when viewed through darkfield optics. The shields (42) are fabricated using conventional semiconductor processes, which are a natural extension of the baseline process.

13 Claims, 5 Drawing Sheets

SPATIAL LIGHT MODULATOR WITH SUPERSTRUCTURE LIGHT SHIELD

This application is a continuation of application Ser. No. 08/414,831, filed Mar. 31, 1995, now abandoned.

BACKGROUND OF THE INVENTION

Spatial light modulators (SLMs) are devices that modulate incident light in a spatial pattern corresponding to an electrical or optical input. The incident light may be modulated in its phase, intensity, polarization, or direction. The light modulation may be achieved by a variety of materials exhibiting various electrooptic or magnetooptic effects, and by materials that modulate light by surface deformation. SLMs have found numerous applications in the areas of optical information processing, projection displays, and electrostatic printing. For additional discussion of various types of micromechanical SLMs and their uses, cross-reference is made to U.S. Pat. No. 5,061,049 to Hornbeck, entitled Spatial Light Modulator and Method; U.S. Pat. No. 5,079,544 to DeMond et al, entitled Standard Independent Digitized Video System; and U.S. Pat. No. 5,105,369 to Nelson, entitled "Printing System Exposure Module Alignment Method and Apparatus of Manufacture", each patent being assigned to the same assignee as the present invention, and the teachings of each are incorporated herein by reference.

The SLM may be binary in that each pixel element of an area or linear array may have a deflectable beam addressable to have either of two states. The pixel element may be "off", and deliver no light to a receiver. Conversely, the pixel element may be "on", and deliver light at a maximum intensity to the receiver. The receiver may include a display screen, light sensitive photoreceptor drum etc. One such SLM is known as a digital micromirror device (DMD), with a deflectable beam mirror element, manufactured by Texas Instruments Incorporated of Dallas Tex., disclosed in the aforementioned patents. To achieve a viewer perception of intermediate levels of light or gray scale, various pulse width modulation techniques can be used. One modulation technique is described in U.S. Pat. No. 5,278,652, entitled "DMD architecture and timing for use in a pulse-width modulated display system", assigned to the same assignee as the present invention, and the teachings of which are incorporated herein by reference.

Referring now to FIG. 1, FIG. 2 and FIG. 3, a typical micromechanical pixel 10 comprising one of thousands such pixels of an array forming spatial light modulator 30 is shown. FIG. 2 illustrates the bi-stable operation of each pixel 10 to modulate incident light, this incident light being modulated by pixel array 30 to form a light image. For purposes of illustration, a relatively simple pixel 10 is shown, although more complex hidden-hinge type pixels can be formed having an elevated mirror, and may have a modified post, or no post.

Referring to FIG. 1, one micromechanical picture element (pixel) 10 is shown. Pixel 10 comprises one of thousands such pixels forming a linear or area array of pixels comprising a digital micromirror device (DMD) type spatial light modulator (SLM) as shown in FIG. 3. Pixel 10 is of the torsion type seen to include a pair of vertically extending metal hinge support posts 12 formed upon a semiconductor wafer substrate 14, such as silicon, and supporting an elongated metal hinge 16 extending therebetween. Hinge 16 supports a light reflective beam 18 positioned therebetween operating as a mirror. Beam (mirror) 18 is axially supported over a pair of opposed addressing electrodes 22 and a pair of beam tip landing pads 24. Addressing circuitry fabricated on substrate 14 (not shown) includes an array of SRAM memory cells storing pixel position information. These memory cells are usually loaded by column data shift registers (not shown). When pixel 10 is addressed by row address circuitry (not shown), these memory cells transfer bias voltages to address electrodes 22 to electrostatically deflect mirror 18 about its axis. These electrostatic forces created by a voltage potential between address electrodes 22 and beam 18 cause beam 18 to rotate toward the address electrode 22 providing the greatest potential between the mirror and the electrode.

Referring to FIG. 2, beam mirror 18 is shown to be deflectable in one of two directions from horizontal by an angle $\theta$. Mirror 18 is deflectable plus or minus 10 degrees from a flat orientation, as shown. In one orientation, modulated incident light is directed and focused to either a screen in the case of a projector or T.V./Video monitor, or ultimately focused to light sensitive photoreceptor drum in the case of an electrostatic printer. In the other orientation, light is directed to a light collector. Arrays of these pixels are modulated to form light images that are directed to the projection screen or the photoreceptor drum, as discussed more thoroughly in the aforementioned patents, these patents being assigned to the same assignee as the present invention, and the teachings of which are included herein by reference.

Referring to FIG. 3, most of the incident light 32 illuminating DMD 30 is modulated by the array of pixel mirrors 18. The geometry of this pixel is configured so that the edges 34 of each pixel mirror 18 are oriented to extend at an angle approximately 45° or 135° with respect to the incident light 32. By orienting the mirror edges at these angles, the diffraction of light, known as diffraction terms, from the mirror edges 34 into the projection optics is minimized.

However, as shown, the incident light is normal to the hinges 16 and support posts 12, which maximizes the diffracted light from the hinges, shown at 36, into the projection optics. To obtain a high contrast light image, "off" mirrors 18 of array 30 should appear as black (dark state) when viewed through projection optics that is, no incident light should be reflected by the mirror or associated structure into the collector lens. Because of the diffracted light 36, even when all the mirrors are in the off position, the contrast ratio of the light image is less than ideal. Again, this is primarily due to the diffracted light from the hinges directed into the collector lens, but is also due to other diffracted light from the support posts 12, the mirror tips, and the underlying addressing circuitry, i.e. address electrodes, which are further exposed when the mirror tilts.

It is desired to provide a spatial light modulator with an improved contrast ratio, whereby the diffraction of light from the pixels and superstructure into the collector lens is minimized. Achieving a contrast ratio exceeding 100:1 is desirable.

SUMMARY OF THE INVENTION

The present invention achieves technical advantages by providing a geometric shield oriented over the pixel superstructure and pixel tips. This light shield prevents incident light from a light source from impinging upon the pixel superstructure and generating diffraction terms, in particular, the mirror hinges and support posts, as well as the exposed underlying address circuitry. This light shield forms an "umbrella-like" cantilever shield over the hinges and posts, and has a geometry such that the shield edges are oriented at 45° and 135° with respect to the incident light to minimize light diffraction from the shield edges being directed into the projection optics. The light shield also obscures the mirror tips of adjacent mirrors, further reducing the creation of diffraction terms.

The present invention comprises a spatial light modulator having a substrate and addressing circuitry formed on the substrate. A support structure is formed proximate this addressing circuitry, with at least one reflective, movable pixel being supported by this support structure over the addressing circuitry. A shield device is fabricated over this support structure that shields the support structure from incident light illuminating the spatial light modulator.

Preferably, the shield device is elevated above the support structure. The shield member cantilevers over the support structure, preferably 360° about the support structure. The support structure may comprise a post, and at least one hinge supported by and extending from the post to the pixel. The shield member is fabricated over and separated from the hinge. The entire device and light shield are fabricated using conventional semiconductor processes.

An array of pixels form the spatial light modulator, and an array of shields are provided. A separate shield shields each support structure associated with each pixel and the adjacent pixel tips from light incident to the spatial light modulator. The shield members are configured to have edges extending at approximately 45° and 135° with respect to the incident light. In a torsion hinge type pixel array, the shield edges extend approximately 45° with respect to the axis of mirror rotation. The shields are elevated above the mirror tips to de-tune this vertical structure from diffracting in the visible spectrum, including when the mirror tips are raised when rotated. The shields are preferably flat, and are substantially rectangular in shape. The shield members may have a light absorbing upper surface, preferably comprised of an anodized surface. The shield member, support structure and the pixel are may be comprised of an electrically conductive material, or an insulative material if desired. The addressing circuitry preferably includes at least one underlying address electrode, whereby a voltage potential applied to the address electrode induces deflection of the associated pixel extending thereabove. The support structure preferably comprises a pair of torsion hinges supporting the pixel along a central axis thereof, however, cantilevered pixels supported by a single hinge are also suitable for the present invention as well, with the light shield shielding the associated hinges, posts and underlying address circuitry.

These light shields can be conveniently fabricated by performing a few additional steps during fabrication of the SLM device. These additional steps are consistent with those performed to fabricate a DMD type SLM, and do not unnecessarily complicate the baseline fabrication process. The shields are easily fabricated by depositing a spacer layer upon the mostly fabricated spatial light modulator, forming vias in the spacer layer above the superstructure posts, depositing a layer of metal over the spacer layer and into the vias, and then patterning and exposing this metal layer to form the light shield. Thereafter, this spacer layer can be ashed away with the first spacer layer existing under the pixel, which is the last step of the semiconductor process.

A good fill factor is still established with the high density layout of the pixel mirrors. The height of the light shield is sufficient to reduce the opportunity for secondary reflection paths under the shield. The shields do not add to the mirror mass, and do not effect mirror inertia or switching times. In addition, the cantilevered light shields are designed to minimize thermal conductivity of heat to the underlying support posts to limit thermal loading of the DMD SLM. The light shields completely overlap the mirror hinges, and only slightly shadow the pixel mirrors modulating the incident light.

BRIEF DESCRIPTIONS OF THE DRAWINGS

FIGS. 1–3 illustrate a typical prior art micromechanical spatial light modulator and the general operation thereof, and depict the problem of incident light diffracting from the hinges of the pixel mirror superstructure into the projection optics;

FIG. 4 is a top view of a spatial light modulator including an array of pixel mirrors with a light shield fabricated over each of the pixel hinges and posts, these shields being elevated and forming an "umbrella-like" shade over the superstructure and adjacent mirror tips, and having edges oriented at 45° and 135° with respect to the incident light to minimize light diffraction therefrom; and FIGS. 5–12 sequentially illustrate the steps performed to fabricate the SLM device including the matrix of integral light shields.

DETAILED DESCRIPTION OF THE PREFERRED EMBODIMENT

Those skilled in the art to which this invention relates will appreciate that other substitutions and modifications can be made to the described embodiment, including the type of pixel illustrated, without departing from the spirit and scope of the invention.

Figure 1:
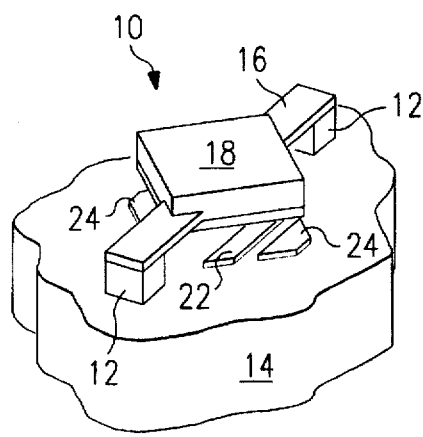
Figure 2:
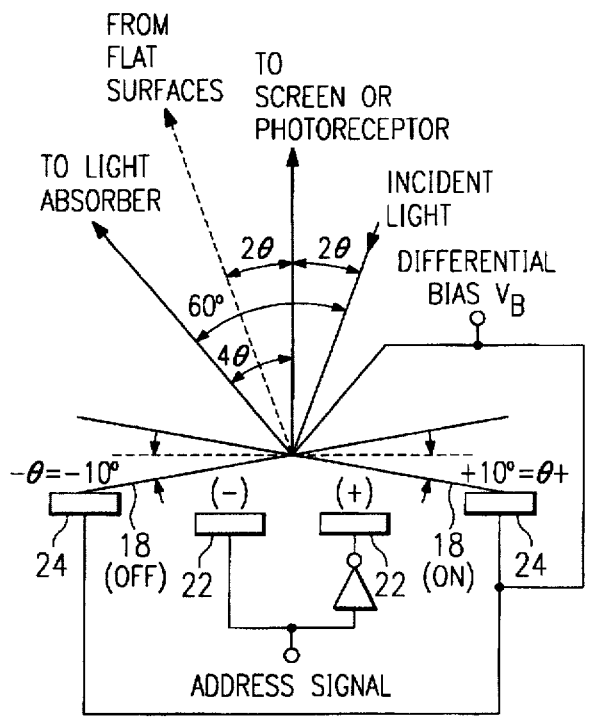
Figure 3:
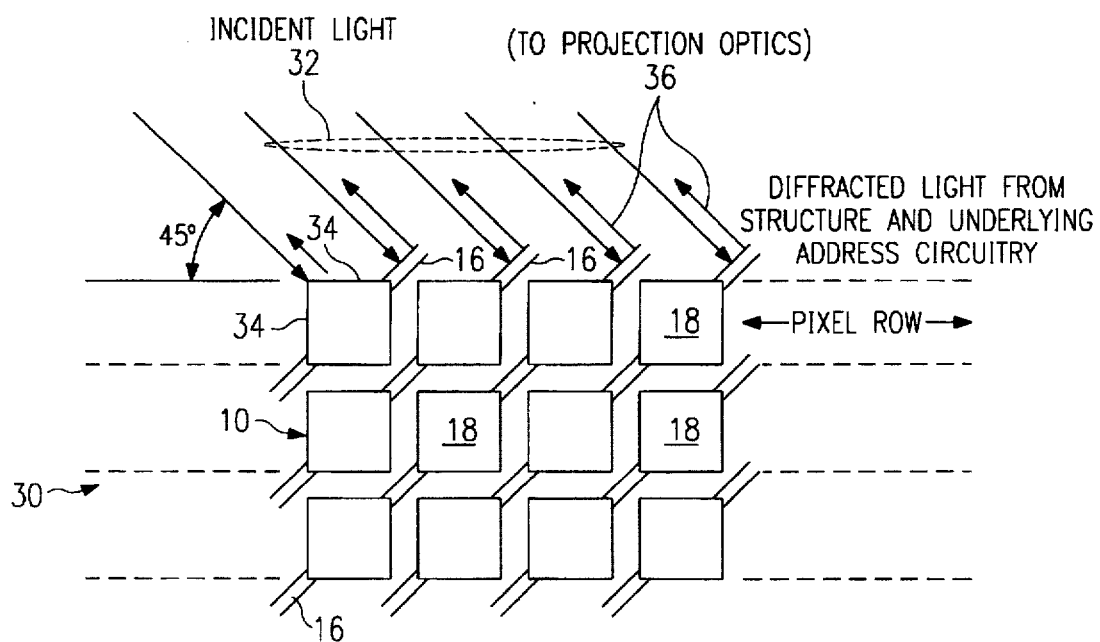

FIGS. 1, FIG. 2 and FIG. 3 are described previously in the section entitled Background of the Invention, and illustrate a prior art DMD-type spatial light modulator including torsion mirrors. As shown in FIG. 3, incident light 32 to array 30 is diffracted by hinges 16 into the projection optics (not shown) at an undesirable level due to hinges 16 being perpendicularly oriented with respect to the incident light.

Figure 4:
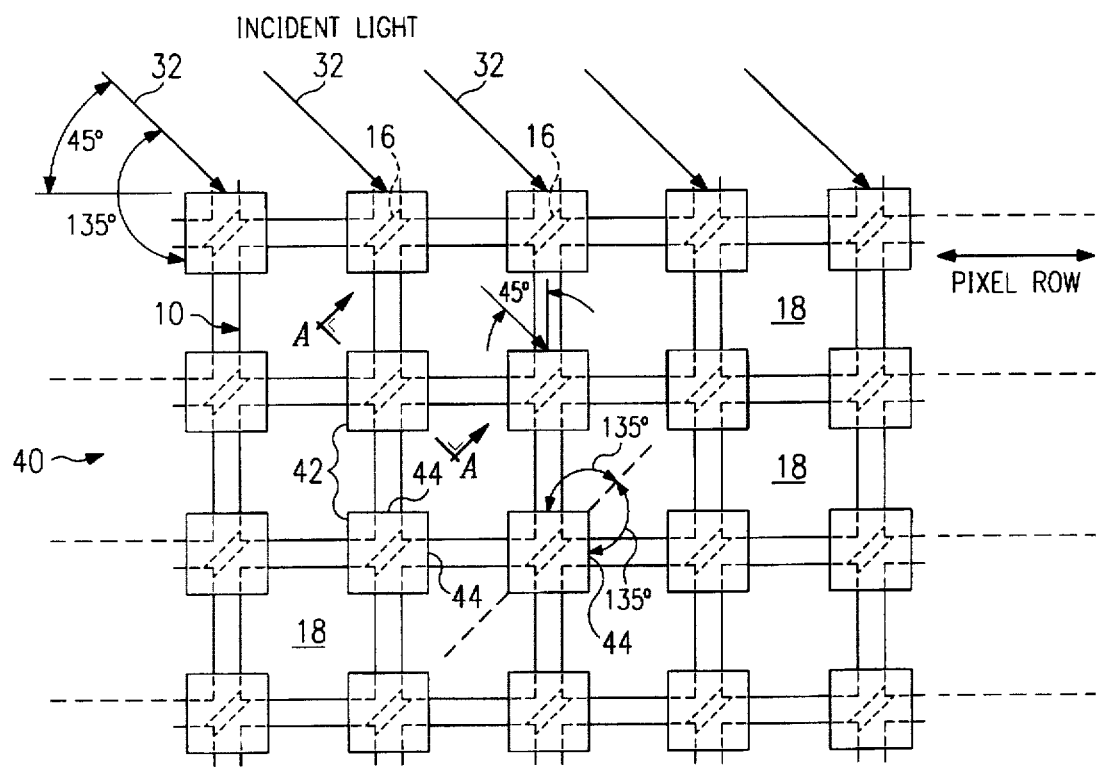

Referring now to FIG. 4, a spatial light modulator according the preferred embodiment of the present invention is generally shown at 40. Spatial light modulator 40 includes all the basic structure of spatial light modulator 30 shown in FIGS. 1–3, wherein like numerals refer to like elements, including the geometrically oriented mirrors 18 to minimize producing diffraction terms viewable through the projection optics. In addition, an elevated light shield, generally shown at 42, is fabricated over each of the hinges and support posts of the superstructure associated with mirror 18, and over the tips of adjacent mirrors 18. These light shields are elevated and geometrically oriented to provide an "umbrella-like" cantilevered light shield over the associated hinges and posts, as shown. The light shields 42 completely overlap the two adjacent hinges 16, and obscure the two adjacent mirror tips. Each shield 42 only slightly overlaps or shadows the four associated mirrors 18, and thus does not significantly shadow or obscure incident light from impinging upon each of the adjacent mirrors 18 of array 40. Each shield 42 has a rectangular geometry, and is generally square or diamond shape, as shown. The edges 44 of the shield are oriented at approximately 45° and 135° with respect to the incident light to minimize the diffraction of light from the edges which are directed into the projection optics. In the preferred embodiment the edges 44 of shields 42 are oriented at 45° with respect to the axis of rotation of the pixels, as shown.

Each of the shields 42 is fabricated of metal, preferably aluminum, with the upper surface thereof being anodized and thus having a black surface to provide a non reflective surface. Alternatively, thermally non-conductive materials could be used if desired. These shields, when viewed through the projection optics, appear as black because of the black surfaces and the dark field optical system, and because light incident to the horizontally flat shields is not reflected into the optics. These light shields 42 are fabricated using robust semiconductor processing techniques used to fabricate the superstructure and mirrors 18, this shield fabrication requiring a few additional steps as will now be described in regards to FIGS. 5–12.

Referring now to FIGS. 5–12, the respective view of each associated figure being taken along line A—A in FIG. 4, there is illustrated the fabrication of one light shield 42 and the two associated pixels 10 of spatial light modulator 40. While a rectangular torsion-type pixel mirror 18 that is coplanar with its hinges is shown in the preferred embodiment by way of illustration, limitation to the particular shape and design of pixel 18 is not to be inferred, for pixel mirrors 18 could also be fabricated as cantilever or leaf-type pixels with a single hinge, such as those disclosed in U.S. Pat. No. 4,956,619 to Hornbeck, U.S. Pat. No. 5,172,262 to Hornbeck, and U.S. Pat. No. 4,710,732, to Hornbeck, each of these patents are being assigned to the same assignee as the present invention, and the teaching included herein by reference. Thus, one or more pixel mirrors cantileverly supported by one respective hinge from a central support post could also be implemented as well, with the light shield of the present invention being fabricated over these hinges and support posts as discussed.

Figure 5:
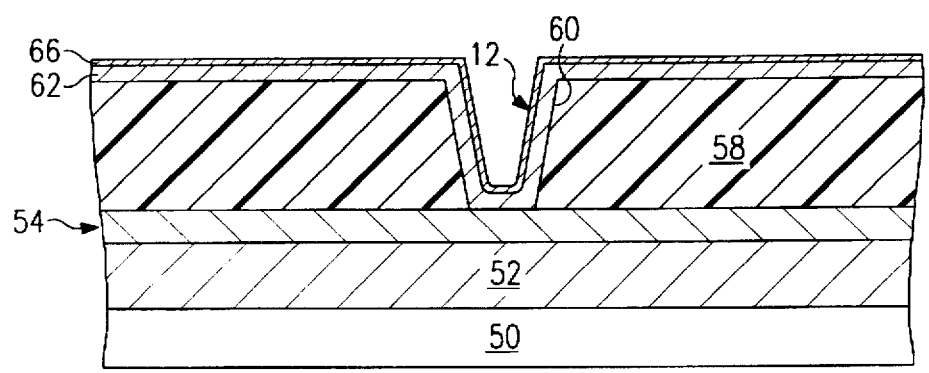

Referring now to FIG. 5, a silicon substrate 50 is processed to include an array of SRAM cells (not shown) and associated pixel data bit lines communicating pixel data between pixel data loading shift registers (not shown) and the SRAM cells, as is disclosed in the commonly assigned co-pending patent application Ser. No. 08/373,692 entitled "Monolithic Programmable Digital Micro-Mirror Device" filed Jan. 27, 1995, the teachings included herein by reference. An array of buffed passive charge storage cells could be used instead of the SRAM devices if desired, as disclosed in the commonly assigned co-pending patent application attorney's docket #TI-19626 entitled "Spatial Light Modulator with Buffed Passive Charge Storage Cell Array" filed Feb. 2, 1995, the teachings included herein by reference. Next, a layer of field oxide 52 is deposited over processed substrate 50 to provide an insulative non-conductive coating over substrate 50. Next, a first layer of metal known as metal-one, shown generally at 54, is deposited and patterned over oxide layer 52 to define address electrodes 20 (See FIG. 1). These address electrodes 20 are in electrical communication with the SRAM cells through vias extending through oxide layer 52 to the SRAM cells. Next, a thick layer of photoresist 58 is deposited over patterned metal layer 54 to form a spacer layer, and developed to form a via 60.

Next, a hinge layer 62 of metal is sputter deposited over spacer layer 58, preferably titanium tungsten but could comprise of other conductive metals such as aluminum, and into via 60 to form post 12. The hinge layer of metal 62 is sputter deposited over spacer layer 58 to achieve a layer having a thickness of approximately 500 angstroms. Next, a thin layer of aluminum 66 is sputter deposited over hinge layer 62, having a thickness of about 100 angstroms.

Figure 6:
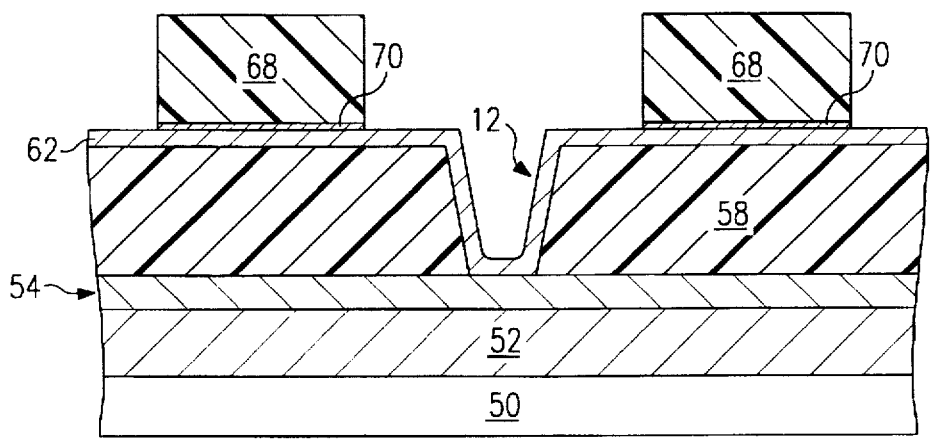

Referring now to FIG. 6, the thin aluminum layer 62 is coated with a thick layer of photoresist, this photoresist being patterned and developed to simultaneously form a photoresist mask 68 and an aluminum hard hinge mask 70, as shown. This step simultaneously forms the aluminum mask due to aluminum's solubility in the developer. Thereafter, the photoresist mask 68 is removed. Alternatively, an oxide mask could be used to form the hinge mask over hinge layer 62 if aluminum is used as the hinge layer.

Figure 7:
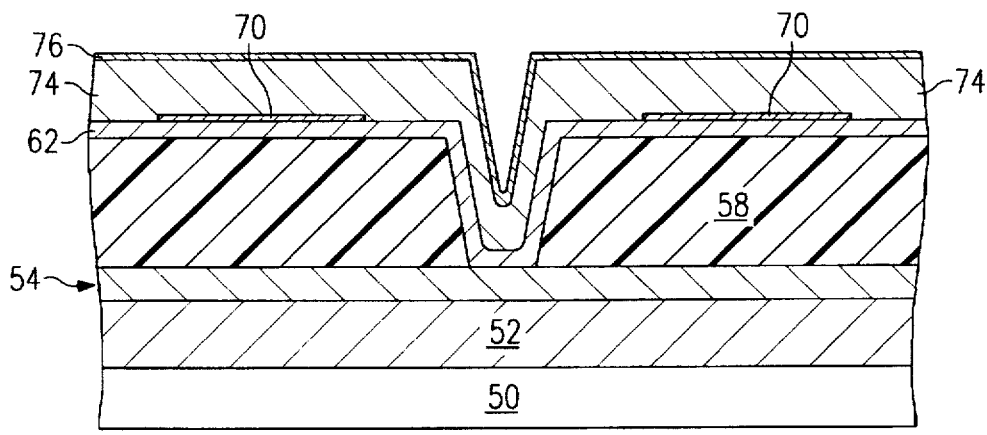

Referring now to FIG. 7, a beam layer 74 is sputter deposited over the partially processed wafer shown in FIG. 6, but could also comprise of other metals such as aluminum, if desired. Beam has a thickness of approximately 2000 angstroms and achieves good step coverage over hinge mask 70. This beam layer 74 buries the titanium tungsten binge layer 62 and aluminum hard mask 70, as shown. Next, a thin layer of aluminum 76 is sputter deposited over beam layer 74, preferably comprised of aluminum, and having the thickness of about 100 angstroms.

Figure 8:
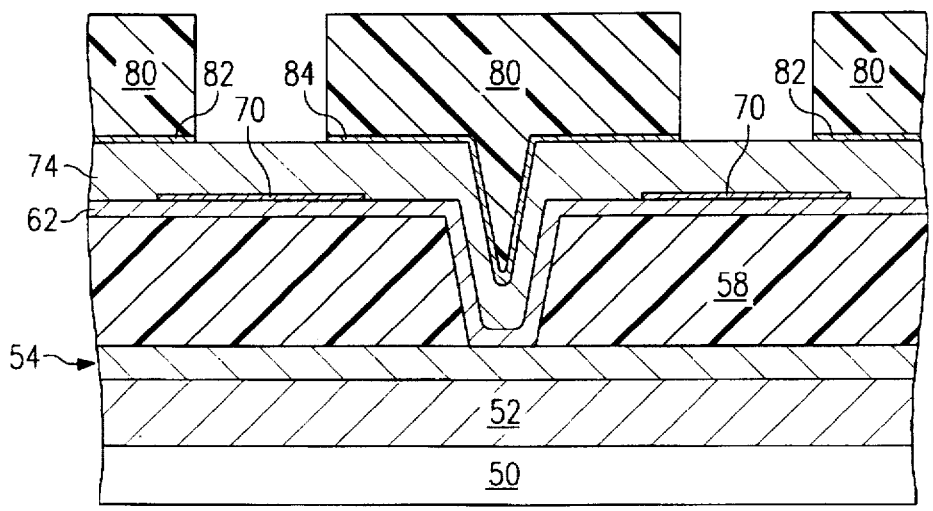

Referring now to FIG. 8, a thick layer of photoresist is deposited over aluminum layer 76, patterned and developed to simultaneously form a photoresist mask 80 and an aluminum hard beam mask 82, as well as a post mask 84. Thereafter, the photoresist mask 80 is removed, leaving the aluminum hard beam mask 82 and post mask 84 over the titanium tungsten beam layer 74. A sacrificial oxide mask could be used in place of aluminum mask 82 if beam layer 74 is aluminum.

Figure 9:
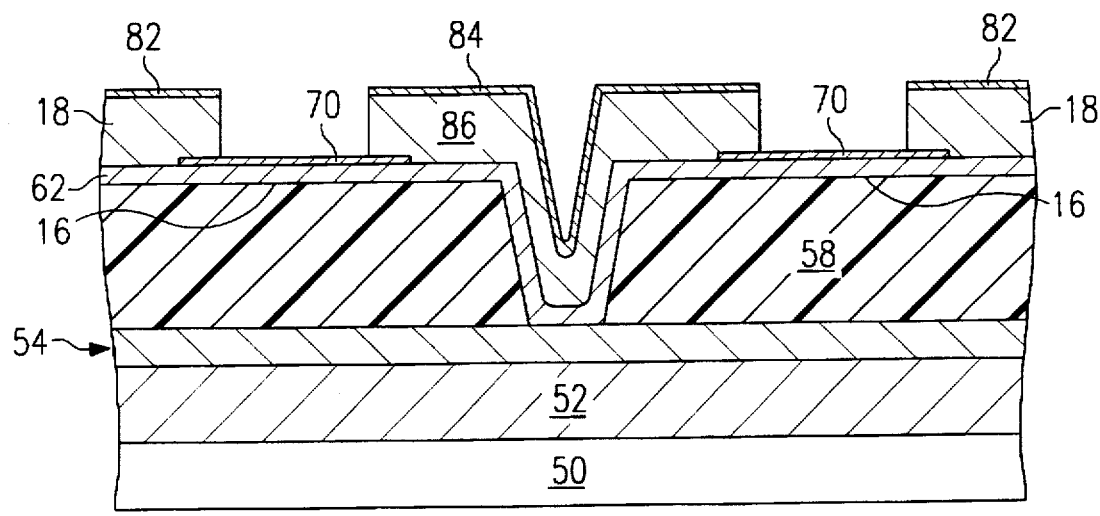

Referring now to FIG. 9, the titanium tungsten beam layer 74 and the titanium tungsten hinge layer 62 are plasma etched preferably with $SF_6$, with the beam mask 82 defining the beam 18 and the hinge mask 70 providing an etch stop, thus forming hinge 16. Post mask 84 forms a post cap 86 during this step, as shown.

For additional discussion of the semiconductor processing steps so far, cross-reference is made to co-pending patent application Ser. No. 08/396,024, filed Feb. 27, 1995 entitled "Method for Creating a Digital Micromirror Device Using an Aluminum Hard Mask," this patent application being assigned to the same assignee as the present invention, and the teaching included herein by reference.

Figure 10:
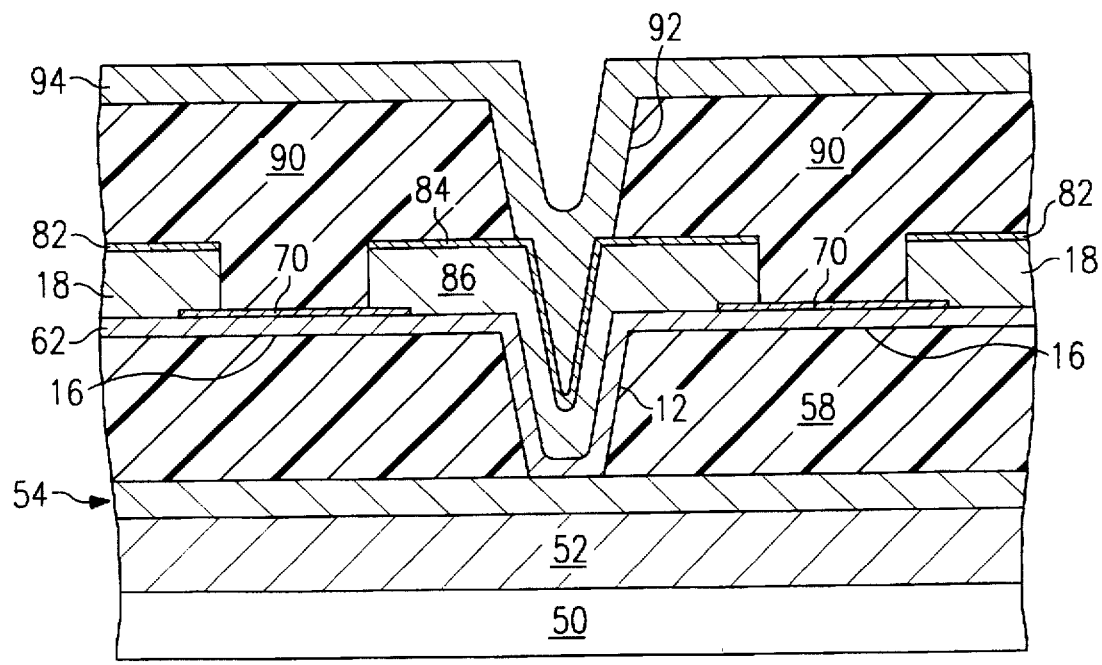

Turning now to FIG. 10, the partially processed wafer of FIG. 9 is coated with a thick layer of photoresist 90, preferable being 2 microns thick. This photoresist layer 90 forms a spacer layer, and is patterned and developed to form a via 92 directly over each post cap 86 of post 12, as shown. Next, a layer of aluminum 94 is sputter deposited over the patterned spacer layer 90, this aluminum layer achieving good step coverage in the via 92, as shown. Layer 94 preferably has a thickness of about 500 angstroms. Other metals could be used as well, including titanium tungsten to achieve a low reflectivity surface.

Figure 11:
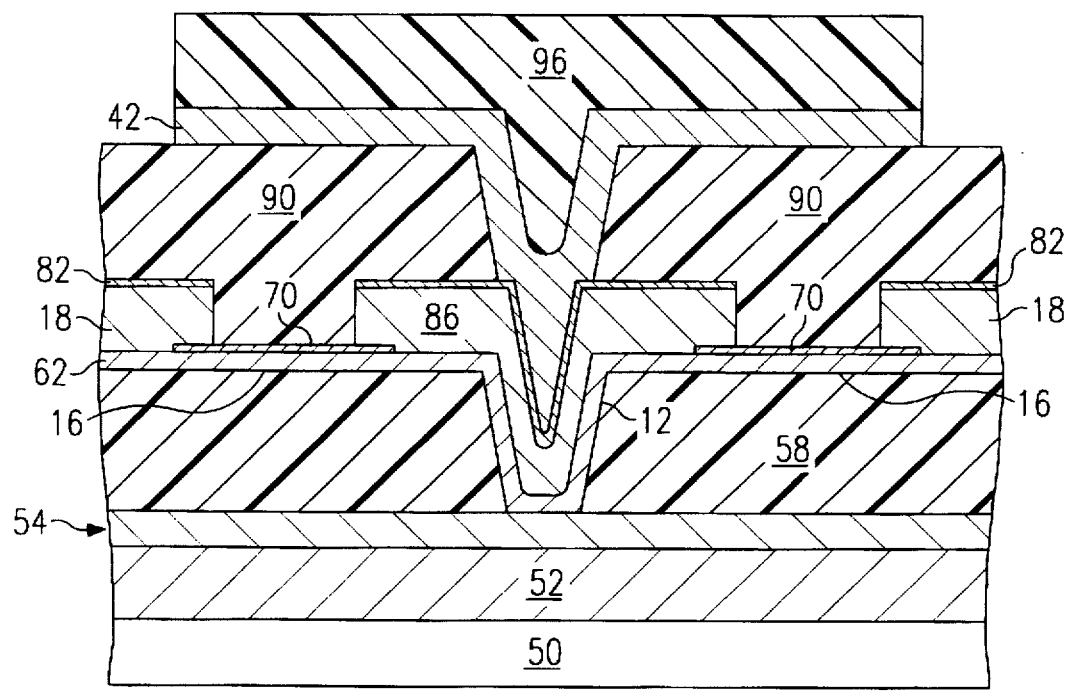

Referring now to FIG. 11, the aluminum layer 94 is coated with a thick layer of photoresist, this photoresist being patterned and developed to simultaneously define a photoresist shield mask 96 and the corresponding superstructure light shield generally shown at 42.

Figure 12:
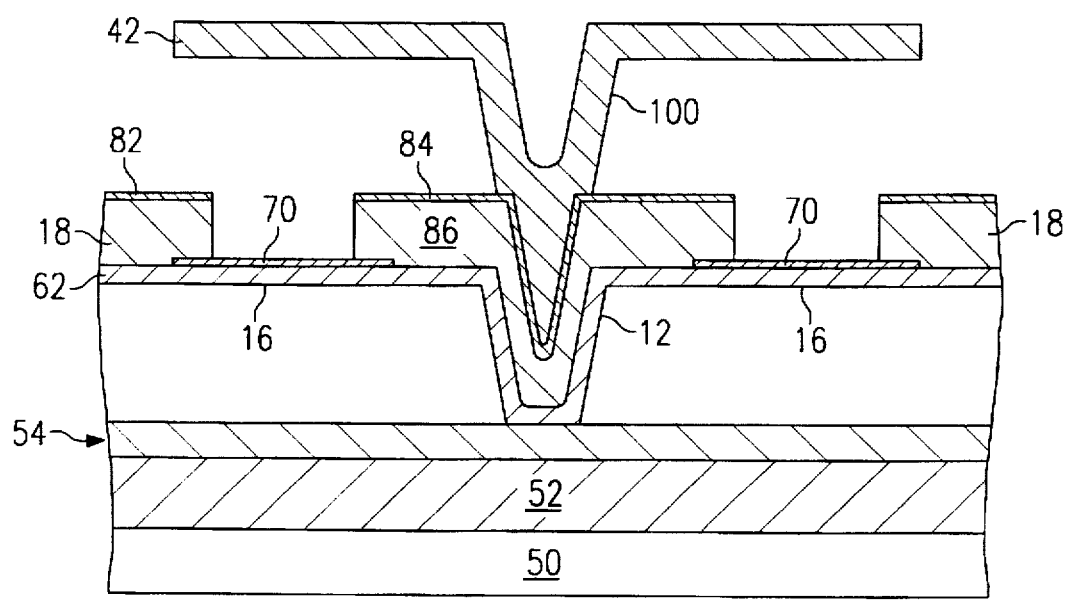

Referring now to FIG. 12, this photoresist shield mask 96 is removed The spacer layers 90 and 58 are then ashed away, as shown, to free the hinges 16 and beam 18 from the underlying addressing circuitry, and in addition, define the elevated light shield 42 above the hinges 16. Each light shield 42 completely overlaps the associated hinges 16 of adjacent pixels 10, and the mirror tips of adjacent mirrors 18, but only slightly obscures or shadows the four adjacent pixel mirrors 18 from the light source. As shown, the light shield 42 extend radially outward in all directions from a support post 100, and forms a 360° "umbrella-like" elevated shield. Shield 42 shields the underlying structure from the illumination source, thus preventing the diffracting incident light, thus improving the contrast ratio. Post 100 is anchored to the underlying hinge post 12.

Referring back to FIG. 4, the geometry of each of these shields 42 is generally diamond or rectangular in shape, having four edges 44. Each edge is oriented to extend approximately 45° or 135° with respect to the incident light, and 45° with respect to the axis of rotation as shown. Thus, diffraction of light from the shield edges is directed away from the projection optics. The surface of shields 42 are flat and horizontally oriented so as to not reflect incident light into the darkfield optics. The height of shield 42 above mask 84 is approximately 2 microns, and is sufficient in height to minimize secondary reflections of light off the underside of the shield 42. With the shields 42 being elevated as shown, the spacing is adequate so they do not interfere with the rotation of beams 18. Since the shields are structurally separate from the hinges, they do not increase the mirror mass, and thus do not affect the mirror inertia or the associated switching times of the mirrors. Due to the narrow support column 100, heat generated on shield 42 by incident light is minimized from propagating to the underlying DMD structure. The shields could be comprised of a thermally non-conductive material if desired. The shields are sufficiently elevated above a raised mirror tip to de-tune this vertical structure from diffracting in the visable spectrum.

The geometric implementation of light shields over the pixel superstructure improves the contrast ratio of the spatial light modulator by eliminating the diffraction of terms at the hinges, and at the mirror tips. The shields themselves are geometrically oriented to minimize any diffracted terms from being viewed through the projection optics. The shields have flat, horizontally oriented surfaces so as to not reflect incident light into the darkfield optics. With the additional material inside the posts 12, the mechanical integrity of the superstructure is improved. There are no modifications to the moving portion of the superstructure, and the mirror inertia and switching times are unaffected. The processing required is a natural extension of existing technology, and requires only a few additional steps from the baseline fabrication procedures. The shields may have an anodized upper surface, to ensure incident light is absorbed and is not directed into the darkfield projection optics. The narrow support posts of the shield minimizes any thermal effects to the support posts due to thermal heating of the shields.

Though the invention has been described with respect to a specific preferred embodiment, many variations and modifications will become apparent to those skilled in the art upon reading the present application. It is therefore the intention that the appended claims be interpreted as broadly as possible in view of the prior art to include all such variations and modifications. For instance, providing a geometrically oriented light shield over other types of micromechanical pixels including those of the cantilever type disclosed in the cross referenced patents, as these devices also stand to benefit from the present invention. Hence, limitation to SLMs of the torsion-mirror type is not to be inferred, and shielding the support structure including hinges, mirror tips and underlying address circuitry of micromechanical SLMs in general is considered within the scope of the present invention.

We claim:

1. A spatial light modulator, comprising;
   a) a substrate;
   b) addressing circuitry formed on said substrate;
   c) a support structure fixedly formed upon said substrate;
   d) an array of deflectable pixels supported by said fixed support structure over said addressing circuitry; and
   e) shield means fabricated upon and over said fixed support structure for shielding said support structure associated with at least two adjacent said pixels from incident light illuminating said spatial light modulator said shield means having a light absorbing upper surface.

2. The spatial light modulator as specified in claim 1 wherein said shield means comprises at least one elevated shield member fabricated above said support structure.

3. The spatial light modulator as specified in claim 2 wherein said shield member cantilevers over said support structure.

4. The spatial light modulator as specified in claim 3 where said shield member cantilevers 360° about said support structure.

5. The spatial light modulator as specified in claim 2 wherein said support structure comprises a post fixed to said substrate and a hinge supported by and extending from said post to said pixel, wherein said shield member is fabricated over and separated from said hinge.

6. The spatial light modulator as specified in claim 1 wherein said pixels of said array are arranged in rows, wherein said shield member overlaps at least one said pixel in adjacent said rows.

7. The spatial light modulator as specified in claim 2 wherein said shields are flat and are substantially rectangular in shape.

8. The spatial light modulator as specified in claim 2 wherein said light absorbing upper surface is anodized.

9. The spatial light modulator as specified in claim 2 wherein said support structure, and said pixel are comprised of an electrically conductive material.

10. The spatial light modulator as specified in claim 9 wherein said addressing circuitry includes at least one address electrode, whereby a voltage potential applied across said address electrode and said pixel induces deflection of said associated pixel extending thereover.

11. The spatial light modulator as specified in claim 2 wherein said support structure comprises a pair of torsion hinges supporting said pixel along a central axis of rotation thereof.

12. The spatial light modulator as specified in claim 11 wherein said shield member has edges extending at approximately 45° with respect to said central axis of rotation.

13. The spatial light modulator as specified in claim 11 wherein said shield member completely overlaps one said torsion hinge.

* * * * *